United States Patent [19]

Church et al.

[11] 4,020,329

[45] Apr. 26, 1977

[54] APPARATUS FOR RADIATION DOSE MEASUREMENT

[75] Inventors: Victor Eric Church, Engadine; Herbert James Fraser, Bulli; Ralph William Matthews, Georges Hall, all of Australia

[73] Assignee: Austrailian Atomic Energy Commission, Coogee, Cliffbrook, Australia

[22] Filed: Aug. 4, 1975

[21] Appl. No.: 601,704

Related U.S. Application Data

[63] Continuation-in-part of Ser. No. 300,407, Oct. 20, 1972, abandoned.

[30] Foreign Application Priority Data

Oct. 21, 1971  Australia .......................... 6741/71

[52] U.S. Cl. .................. 235/151.3; 204/195 R; 235/193; 250/336
[51] Int. Cl.[2] .......................... G01V 1/28
[58] Field of Search ............ 235/151.3, 193, 193.5, 235/196, 199; 204/195 R, 195 M, 232, 242; 250/336, 472, 473, 474

[56] References Cited

UNITED STATES PATENTS

| | | | |
|---|---|---|---|
| 3,179,581 | 4/1965 | Lewin et al. | 250/336 |
| 3,253,147 | 5/1966 | Schellekens | 250/472 |
| 3,464,798 | 9/1969 | Kilthau | 250/472 |
| 3,700,503 | 10/1972 | Fletcher | 250/336 |

*Primary Examiner*—Joseph F. Ruggiero
*Assistant Examiner*—Errol A. Krass

[57] ABSTRACT

An apparatus for the direct measurement of total radiation dose from the difference in electrochemical potential between an unirradiated solution containing known concentrations of ceric and cerous ions and a gamma or electron irradiated solution initially containing the same known concentrations of ceric and cerous ions. The apparatus comprises a cell which is divided into two sections, which are separated by a porous frit. Unirradiated solution is placed in one section of the cell and irradiated solution is placed in the other section such that the potential difference across the two sections of the cell is converted into a total radiation dose reading of the irradiated solution.

14 Claims, 2 Drawing Figures

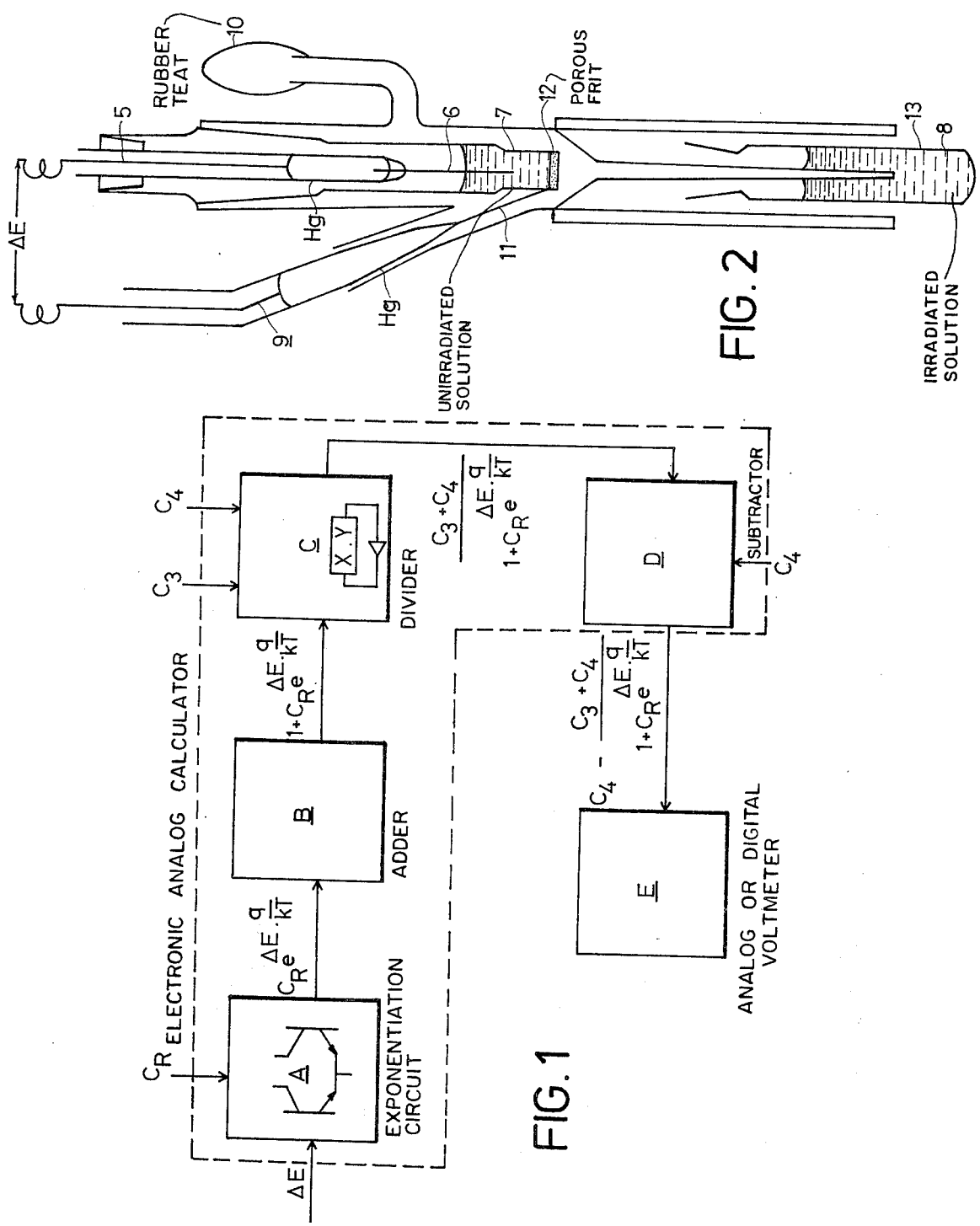

APPARATUS FOR RADIATION DOSE MEASUREMENT

This application is a continuation-in-part of U.S. patent application Ser. No. 300,407 filed Oct. 20, 1972 now abandoned.

BACKGROUND OF THE INVENTION

This invention relates to Megarad Dose Meters and more particularly to a Potentiometric Chemical Dosimeter.

Ionizing radiations are being used in the agricultural, biological, chemical, food, medical, pharmaceutical and allied industries for disinfestation, preservation and sterilization of raw and finished products and for the manufacture of chemicals and polymers. For many of these applications the dose of radiation required is in the range 0.2 to 50 megarad. One important industrial process is the radiation sterilization of medical supplies, for which doses in the range 2.5 to 4.5 megarads have been specified by Health Authorities throughout the world. Other important processes are polymerization and cross-linking which require radiation doses of about 1 and 10 megarads respectively.

Numerous physical and chemical methods have been developed for the measurement of dose in the megarad range. Only a few are convenient to use and sufficiently reliable to be widely accepted and useful for routine industrial applications. Chemical methods rely on colorimetric change in liquids and solids as a measure of radiation dose, the liquids include ceric sulphate solution and ferrous-cupric sulphate solution and some solid materials which are used include plastics such as polymethylmethacrylate and polyvinyl chloride. While plastic dosimeters are convenient they are not stable with time and require strict standardization in use as well as regular calibration against a reference dosimeter, for example the widely accepted ferrous sulphate chemical dosimeter.

However, of the many methods for dosimetry, the requirements for a conveniently useful dosimeter are rarely achieved. The criteria which are commonly not met are:

1. In chemical dosimeters the response should bear a known fixed relationship to primary radiolytic yields.
2. The dosimeter should be stable for an indefinite period before and after irradiation.
3. The responses should be linear over a wide dose range.
4. The effect of temperature on the response of the dosimeter during and after irradiation should be known and reproducible.
5. The dosimeter should be easily prepared.

The ceric dosimeter system which is a solution of ceric sulphate in sulphuric acid has been investigated for more than a decade by many research workers and is widely accepted. In fact, the International Commission on Radiological Units and Measurements rated this system as the next most useful to the internationally accepted ferrous sulphate dosimeter and recommended its use as a reference standard for radiation doses exceeding 0.05 megarads.

However, the ceric sulphate dosimeter suffers from two disabilities. Firstly, the reduction is sensitive to impurities, particularly at low ceric ion concentrations (<0.001 M) and therefore there is a stringent requirement on the purity of solutions and cleanliness of apparatus. Secondly, the ceric concentration is measured by spectrophotometry or titration. Neither method is well suited to routine use since the spectrophotometric method requires a dilution to a concentration at which Beer's Law is obeyed and the titration is time consuming and requires skill on the part of the operator.

Following chemical analysis of the dosimeter the dose must be calculated or read from specially prepared tables or graphs for converting the measurement to dose. No apparatus apart from that which we claim as our invention allows the direct reading of dose from the ceric dosimeter system unaltered by dilution or titration.

SUMMARY OF THE INVENTION

Our research has shown that the problem of impurities can be eliminated by addition of ceric ions in concentrations greater than $3 \times 10^{-3}$ molar to the solution, thus allowing ceric sulphate dosimetry to be used for the reliable routine measurement of dose in the megarad range without the well known requirements of triply distilled water and specially cleaned glassware. High precision of measurement is achieved using reagents of ordinary chemical purity and singly distilled water contained in glassware subjected to no special cleaning procedure.

A primary object of the present invention is to provide an apparatus for the direct measurement of total radiation dose received by an ionic solution.

A further object is to provide an apparatus for the direct measurement of radiation doses without dilution or titration of the irradiated dosimeter solution and which apparatus may be operated by personnel having a minimum of technical skill.

A further object of the invention is to provide an apparatus whereby an already irradiated solution is transferred to the apparatus for direct measurement of the total radiation dose received by the solution.

Features of the method and apparatus of the present invention are the speed and ease with which measurements can be made. Further, the solutions are not altered by the measurement and are stable for weeks if kept in the dark, so that they can be re-measured at a later date if there is any query about the dose received. These features mean that the dose meter, used in conjunction with standard solutions, can be routinely employed for calibration and measurement of dose in the megarad range by owners and users of industrial and research irradiators.

Prototype instruments tested under industrial and research conditions have shown that reliable measurements, with a precision of better than ± 2% may be rapidly made by personnel with little technical training.

THEORY OF POTENTIOMETRIC ANALYSIS

It is advantageous for the response of a dosimeter to be linear with absorbed radiation over as wide a dose range as possible. The response of the ceric dosimeter of the present invention is substantially directly proportional to $G(Ce^{3+})$, wherein $G(Ce^{3+})$ equals the number of cerous ions formed per 100 eV of absorbed radiation and is markedly dependent on the cerous ion concentration. Ideally a constant cerous ion concentration should be maintained during irradiation. In practice, the cerous ion concentration increase during the irradiation as the ceric ion ($Ce^{4+}$) is reduced to cerous ion ($Ce^{3+}$). By setting the initial cerous ion concentration to at least equal the initial ceric ion concentration, $G(Ce^{3+})$ is controlled to better than ± 1 percent of a constant value from the start to finish of any irradiation within the dose range as shown in Table 1.

TABLE 1

Recommended Initial Ceric and Cerous Ion Concentration for Dose Ranges

| $[Ce^{4+}]$ M × 10³ | $[Ce^{3+}]$ M × 10³ | Dose Range (krad) |
|---|---|---|
| 0.4 | 3.0 | 50 – 150 |
| 1.0 | 3.0 | 110 – 350 |
| 2.0 | 3.0 | 230 – 550 |
| 2.0 | 9.0 | 230 – 700 |
| 4.0 | 9.0 | 400 – 1200 |
| 8.0 | 9.0 | 800 – 2800 |
| 12.5 | 12.5 | 1200 – 5000 |

The ceric-cerous system has a well-defined redox potential.

The potential of a platinum wire dipping into a ceric-cerous solution is $$E = E^\circ + K \log_{10} \frac{[Ce^{4+}] \cdot f(Ce^{4+})}{[Ce^{3+}] \cdot f(Ce^{3+})} \text{ volt} \quad (1)$$

where $E^\circ$ = standard potential for the ceric-cerous couple $K = 2.303$ RT/F
$[Ce^{4+}]$ and $[Ce^{3+}]$ = concentrations of the species within the brackets
$f(Ce^{4+})$ and $f(Ce^{3+})$ = the activity coefficients of the species within the brackets.

Since the sulphuric acid concentration is much greater than the ceric and cerous concentrations in the dosimeter solution, changes in the ionic strength of the dosimeter solutions during irradiation will be small and changes in the activity coefficients also will be small. The difference in potential, $\Delta E$, between an unirradiated solution (denoted by the subscript u) and an irradiated solution (denoted by the subscript i) is given by expression $$\Delta E = K \log_{10} \frac{[Ce^{4+}]_u \cdot [Ce^{3+}]_i}{[Ce^{3+}]_u \cdot [Ce^{4+}]_i} \quad (2)$$

Since the total cerium concentration is constant during irradiation $$[Ce^{4+}]_i = \frac{[Ce^{3+}]_u + [Ce^{4+}]_u}{1 + \frac{[Ce^{3+}]_u}{[Ce^{4+}]_u} \text{antilog}_{10} \frac{\Delta E}{K}} \quad (3)$$

The dose in megarad absorbed by the ceric-cerous dosimeter $$= \left[ [Ce^{4+}]_u - \frac{[Ce^{3+}]_u + [Ce^{4+}]_u}{1 + \frac{[Ce^{3+}]_u}{[Ce^{4+}]_u} \text{antilog}_{10} \frac{\Delta E}{K}} \right] \times \frac{965.2}{\rho \, G(Ce^{3+})} \quad (4)$$

where $\rho$ = density of dosimeter solution in g ml⁻¹;
$G(Ce^{3+})$ = net number of $Ce^{3+}$ ions formed per 100 eV; and
965.2 = conversion factor for the change from molar concentration to dose in megarad.

From the electrochemical potentials measured using irradiated solutions, the ceric concentrations determined spectrophotometrically and the cerous concentration calculated from the mass balance, the value of $E^\circ$ at 25° C was found to be 1440 mV (this compares with the literature value of 1444 mV for 0.5 M sulphuric acid solutions and the K values found were in good agreement with literature value of 59.16 mV for 2.303 RT/F.

The decrease in ceric concentration was found to be linear with dose within experimental error and the $G(Ce^{3+})$ values determined potentiometrically using equation (4) agreed with those obtained spectrophotometrically.

In addition the temperature coefficient for potentiometry was found to be 0.33 percent increase in $\Delta E$ for each degree centigrade increase between 25° and 30° C, which is in agreement with theory.

IN THE DRAWINGS

An embodiment of the present invention will be now described with reference to the accompanying drawings in which:

FIG. 1 shows a schematic block diagram of the circuitry of the present invention which converts the potential difference across the electrodes of the cell into a direct dose reading and the subsequent operation of the circuitry and;

FIG. 2 shows an electrochemical concentration cell according to the present invention.

FIG. 1 is a block diagram of essentially an electronic analog calculator adapted to convert the input $\Delta E$ (that is the electrochemical potential between the irradiated and unirradiated solutions) into a linear scale of dose.

The relation for calculating the dose in megarad may be reduced to the following form:

$$\text{Dose (Mrad)} = A \left[ C_4 - \frac{C_3 + C_4}{1 + C_R \cdot e^{\left(\frac{q}{kT} \cdot \Delta E\right)}} \right] \text{ where } A \text{ is a constant of proportionality}$$

where $C_3$ and $C_4$ are voltages proportional to $[Ce^{3+}]_u$ and $[Ce^{4+}]_u$ respectively;
$C_R$ is a voltage proportional to the ratio $$\frac{[Ce^{3+}]_u}{[Ce^{4+}]_u};$$

$\Delta E$ is the output of an electrochemical cell of the type shown in FIG. 2.

A cell according to the present invention is shown in FIG. 2. The cell comprises two sections. The first section comprising an inner electrode 5 in electrical contact with a platinum wire 6 dipping into an unirradiated solution 7 containing known concentrations of ceric and cerous ions. The second section comprising an outer electrode 9 in electrical connection with the platinum wire 11 and a rubber teat 10.

The irradiated solution 8 which before irradiation contained the same concentrations of ceric and cerous ions is transported in a removable container 13 to the cell. On squeezing the rubber teat 10 the irradiated solution 8 is drawn up into the second section of the cell. The solutions 8 and 7 are separated by a porous frit 12 such that a potential difference $\Delta E$ is produced across the electrodes 9 and 5.

This calculation is carried out firstly by making use of the exponential relation between the collector current and the base to emitter voltages of a transistor operating in the diffusion current region to obtain a current proportion to the term $$C_R \cdot e^{\left(\frac{q}{kT} \cdot \Delta E\right)}$$

In the present embodiment, a matching transistor built on the same chip is used to compensate for temperature changes.

The relation between the collector current $I_{C_1}$ and $I_{C_2}$ of the two perfectly matched transistors with an applied differential, base to emitter voltages of $\Delta E$ is $$I_{C_1} = I_{C_2} e^{\left(\frac{q}{kT} \cdot \Delta E\right)}$$

The circuit is arranged so that $I_{C_2}$ is set proportional to $C_R$ and $I_{C_1}$ is then used for the antilog term in the expression for dose.

The current $I_{C_1}$ has a negative temperature coefficient ($-0.33\%/°C$) which compensates the positive temperature coefficient of $\Delta E (+0.33\%/°C)$ thereby eliminating the need to maintain the cell and instrument at a constant temperature, providing both are at the same temperature.

The output $I_{C_1}$ of the exponentiation circuit A is added to a current proportional to unity by an operational amplifier B, preferably an amplifier of low offset current, which gives a voltage proporational to the term;

$$(1 + C_R e^{\Delta E \cdot q/kT})$$

which is in the correct form for the input of a multiplier C. Feedback is applied to the multiplier to produce the divide function as shown in block C. To avoid using an extra operational amplifier for the addition ($Ce^{3+}$ + $Ce^{4+}$), voltage proportional to these concentrations may be added by the feedback operational amplifier of the divider circuit.

As the output voltage of the divider is proportional to $$\frac{C_3 + C_4}{1 + C_R e^{\Delta E \cdot q/kT}}$$

an operational amplifier D is connected as a subtractor to give an output voltage proportional to the result of the calculation $$C_4 - \frac{C_3 + C_4}{1 + C_R e^{\left(\frac{q}{kT} \cdot \Delta E\right)}}$$

The output voltage drives an analog or digital voltmeter E or any suitable recording apparatus to give a direct linear readout in megarads.

The instrument of this embodiment can measure doses in the range 0.05 to 5.0 megarads with good accuracy for solutions containing suitable solute concentrations. Recommended ceric and cerous ion concentrations for dose ranges within the above range are given in Table 1. The initial cerous ion concentration is not less than $3 \times 10^{-3}$ molar since this concentration has been found to nullify the effect of impurities on the dosimeter response. The instrument controls are preset to correspond with the ceric and cerous ion concentrations in the dosimeter solution.

The embodiment which is described here is designed for solute concentrations for the measurement of doses to 5 megarads but may be modified to measure dosimeter solutions irradiated to 50 megarad doses. However, at the high cerium concentrations necessary for these doses significant errors in dosimetry may occur if there is appreciable degradation of the irradiating energy spectrum. The effect of degraded energy spectrum is dealt with in the following section.

ENERGY SPECTRUM OF RADIATION

The passage of gamma photons through energy absorbing media results in a degradation of the energy spectrum of the photons. This degradation can lead to significant errors in absorbed dose estimation if there are large differences between the average atomic number per ml of the dosimeter solution compared with the average atomic number per ml of the material being irradiated. It has been pointed out by A. Brnjolfsson in "A significant correction factor in gamma ray dosimetry" that ceric dosimeter solutions containing high concentrations of cerium may lead to significant errors in doses because of this effect. From the data given in the previously mentioned paper by Brnjolfsson it can be calculated that a dosimeter solution containing 0.025M cerium exposed to cobalt-60 radiation which has passed through 10 cm of water would absorb approximately 4.4 percent greater dose than water in the same position as the dosimeter solution. Since in practical irradiations the contribution to the total absorbed dose arising from radiation which has been degraded to this extent or greater would be small, significant errors due to the degradation of the energy spectrum are unlikely to arise provided the cerium concentration is 0.025M or less (the concentration range required for 5 Mrad). Experiments made under practical irradiation conditions in which degraded spectrum effects were specifically looked for gave a negative result.

No effect of dose rate was observed on $G(Ce^{3+})$ from any of the ceric-cerous solutions irradiated at dose rates of 60 to 600 krad $h^{-1}$. $G(Ce^{3+})$ from ceric solutions containing no added cerous ions is independent of dose rates to 1800 krad $h^{-1}$. There is no reason to expect any effect of dose rate on aerated ceric solutions containing added cerous ions irradiated at similar dose rates.

$G(Ce^{3+})$ depends slightly on the temperature of the solution during irradiation; $G(Ce^{3+})$ decreases by $0.0052 \pm 0.0005$ units for each degree centigrade increase in temperature between 0° and 50°.

For ease of calibration the instrument may be fitted with an adjustable control to allow for small differences in $G(Ce^{3+})$ for solutions used for different dose ranges or for changes in irradiation temperature. The instrument may also be calibrated against ceric-cerous solutions irradiated to known doses in a cobalt-60 irradiation facility the dose rate of which has been carefully standardized by ferrous sulphate dosimetery.

The following are examples of containers which have been found to be satisfactory for containing dosimeter solutions.

1. flame-sealed Pyrex glass ampoules,
2. flame-sealed standard pharmaceutical ampoules made from neutral glass, and
3. ground glass stoppered Pyrex glass test tubes. In using the latter, the tubes were completely filled with dosimeter solution so that a wet seal was maintained at the joint. It is recommended that for irradiations longer than 24 hours, flame-sealed ampoules be used since some loss of liquid was noted with the stoppered tubes for irradiations of longer duration than this.

Dose rates obtained from several different dosimeter solutions irradiated in a cobalt-60 irradiation facility at various irradiation times and measured on the direct reading digital dosimeter of the described embodiment are given in Table 2. Standard deviations of the dose rates were found to be 0.93, 0.55 and 1.20 percent for the three sets of results. A comparison between doses obtained from the meter and those obtained by the ferrous sulphate method is given in Table 3.

TABLE 2

Statistical Analysis of Results (1) $4 \times 10^{-4}$M $Ce^{4+}$, $3 \times 10^{-3}$M $Ce^{3+}$ solution

| Irrdn. Time (hours) | Krad | Krad h$^{-1}$ (X) | $X - \bar{X}$ | $(X - \bar{X})^2$ |
|---|---|---|---|---|
| 1.039 | 56 | 53.90 | 0.87 | 0.757 |
| 1.520 | 83 | 54.60 | 0.17 | 0.029 |
| 1.750 | 96 | 54.86 | 0.09 | 0.008 |
| 2.016 | 112 | 55.44 | 0.67 | 0.449 |
| 2.335 | 128 | 54.93 | 0.16 | 0.026 |
| 2.645 | 145 | 54.92 | 0.15 | 0.022 |

$\bar{X} = 54.77$   5) $\frac{1.291}{0.258}$ $\sqrt{0.258} = 0.508$
dose rate $= (54.77 \pm 0.51)$ krad h$^{-1}$
standard deviation $= \pm 0.93\%$ (2) $1 \times 10^{-3}$M $Ce^{4+}$, $3 \times 10^{-3}$M $Ce^{3+}$ solution

| Irrdn. Time (hours) | krad | krad h$^{-1}$ (X) | $X = \bar{X}$ | $(X - \bar{X})^2$ |
|---|---|---|---|---|
| 2.338 | 128 | 54.75 | 0.00 | 0.000 |
| 3.039 | 165 | 54.29 | 0.46 | 0.212 |
| 4.000 | 219 | 54.75 | 0.00 | 0.000 |
| 5.040 | 277 | 54.96 | 0.21 | 0.044 |
| 5.709 | 312 | 54.65 | 0.10 | 0.010 |
| 6.348 | 350 | 55.13 | 0.38 | 0.144 |

$\bar{X} = 54.75$   5) $\frac{0.410}{0.082}$ $\sqrt{0.082} = 0.286$
dose rate $= (54.75 \pm 0.29)$ krad h$^{-1}$
standard deviation $= \pm 0.55\%$ (3) $4 \times 10^{-3}$M $Ce^{4+}$, $9 \times 10^{-3}$M $Ce^{3+}$ solution

| Irrdn. Time (hours) | krad | krad h$^{-1}$ (X) | $X - \bar{X}$ | $(X - \bar{X})^2$ |
|---|---|---|---|---|
| 8.31 | 440 | 52.93 | 0.88 | 0.774 |
| 12.16 | 650 | 53.45 | 0.36 | 0.130 |
| 16.00 | 860 | 53.75 | 0.06 | 0.004 |
| 23.87 | 1290 | 54.04 | 0.23 | 0.053 |
| 26.21 | 1410 | 53.80 | 0.01 | 0.000 |
| 27.51 | 1510 | 54.89 | 1.08 | 1.166 |

$\bar{X} = 53.81$   5) $\frac{2.127}{0.425}$ $\sqrt{0.425} = 0.652$
dose rate $= (53.81 \pm 0.65)$ krad h$^{-1}$

TABLE 2-continued

Statistical Analysis of Results standard deviation $= \pm 1.20\%$

TABLE 3

Comparison between Doses given by the Meter and by the Ferrous Sulphate Method

The ceric-cerous solution contained $0.96 \times 10^{-3}$M $Ce^{4+}$ and $3.04 \times 10^{-3}$M $Ce^{3+}$. The dose rate was determined by the ferrous sulphate method. One of the dosimeters containing the ceric-cerous solution was given a dose of 214 krad and introduced into the electrochemical cell. The meter was calibrated to read 214 krad. Other dosimeters containing the same concentration ceric-cerous solution were irradiated to doses given in the Table according to the ferrous sulphate dose rate. The readings given on the meter are recorded in the Table.

| Dosimeter No. | FeSO$_4$ Dose (krad) | Meter Dose (krad) | % Difference |
|---|---|---|---|
| 1 | 125.3 | 125 | 0.24 |
| 2 | 163.0 | 162 | 0.62 |
| 3 | 270.2 | 271 | 0.30 |
| 4 | 306.1 | 305 | 0.36 |
| 5 | 340.4 | 343 | 0.76 |

What we claim is:

1. Apparatus for direct measurement of total radiation dose from the difference in electrochemical potential between an unirradiated solution containing known concentrations of ceric and cerous ions and a gamma irradiated solution initially containing the same known concentrations of ceric and cerous ions comprising:
   a. a cell;
   b. a removable container for transporting the irradiated ceric and cerous ions solution to the cell;
   c. means integral with the cell, for drawing the irradiated solution into the cell;
   d. a first section of the cell for drawing thereinto the irradiated solution;
   e. a platinum electrode positioned in the first section of the cell such that when the first section of the cell contains solution the electrode is immersed;
   f. a second section of the cell contained within the first section for containing said unirradiated solution;
   g. a platinum electrode positioned in said second section and immersed in the solution contained therein;
   h. a porous frit contained in said second section and immersed in the solution contained in said first section;
   i. means connected across said two electrodes of the cell responsive to the produced potential difference between the two said solutions; and
   j. automatic converting means for converting the said potential difference into a total radiation dose reading.

2. The apparatus of claim 1 wherein said automatic converting means comprises an analog calculator for converting said potential to said reading and having circuitry comprising, between the input and output of said calculator, additive means; divide function means;

subtraction means; and an exponentiation circuit with output coupled as an input to said additive means, the output of said additive means being coupled to an input of said divide function means having an output coupled to an input of said subtraction means, the output of said subtraction means being proportional to a dose received by the irradiated solution.

3. The apparatus of claim 2 wherein said exponentiation circuit comprises two matching transistors manufactured on the same chip.

4. The apparatus of claim 2 wherein said additive means comprises an operational amplifier of low offset current.

5. The apparatus of claim 2, including a divide function circuit comprising an electronic multiplier with feedback.

6. The apparatus of claim 2, wherein said exponentiation circuit comprises automatic temperature compensation circuitry for compensating against changes in the electrochemical potential difference between the irradiated and unirradiated solutions due to changes from the temperature 25° C of the temperature of the solutions.

7. The apparatus of claim 2, including a display device connected to said calculator output for providing a direct reading of the dose.

8. Apparatus for direct measurement of total radiation dose from the difference in electrochemical potential between an unirradiated solution containing known concentrations of ceric and cerous ions and an electron irradiated solution initially containing the same known concentrations of ceric and cerous ions comprising:

a. a cell;
b. a removable container for transporting the irradiated ceric and cerous ions solution to the cell;
c. means integral with the cell, for drawing the irradiated solution into the cell;
d. a first section of the cell for drawing thereinto the irradiated solution;
e. a platinum electrode positioned in the first section of the cell such that when the first section of the cell contains solution the electrode is immersed;
f. a second section of the cell contained within the first section for containing said unirradiated solution;
g. a platinum electrode positioned in said second section and immersed in the solution contained therein;
h. a porous frit contained in said second section and immersed in the solution contained in said first section;
i. means connected across said two electrodes of the cell responsive to the produced potential difference between the two said solutions; and
j. automatic converting means for converting the said potential difference into a total radiation dose reading.

9. The apparatus of claim 8 wherein said automatic converting means comprises an analog calculator for converting said potential to said reading and having circuitry comprising, between the input and output of said calculator, additive means; divide function means; substraction means; and an exponentiation circuit with output coupled as an input to said additive means, the output of said additive means being coupled to an input of said divide function means having an output coupled to an input of said subtraction means, the output of said subtraction means being proportional to a dose received by the irradiated solution.

10. The apparatus of claim 9 wherein said exponentiation circuit comprises two matching transistors manufactured on the same chip.

11. The apparatus of claim 9 wherein said additive means comprises an operational amplifier of low offset current.

12. The apparatus of claim 9, including a divide function circuit comprising an electronic multiplier with feedback.

13. The apparatus of claim 9, wherein said exponentiation circuit comprises automatic temperature compensation circuitry for compensating against changes in the electrochemical potential difference between the irradiated and unirradiated solutions due to changes from the temperature 25° C of the temperature of the solutions.

14. The apparatus of claim 9, including a display device connected to said calculator output for providing a direct reading of the dose.

* * * * *